United States Patent
Brousseau et al.

(10) Patent No.: US 11,615,630 B1
(45) Date of Patent: Mar. 28, 2023

(54) SYSTEM AND METHOD FOR GENERATING CONTEXT-RICH PARKING EVENTS

(71) Applicant: GENETEC INC., St-Laurent (CA)

(72) Inventors: Guy Brousseau, Laval (CA); Chris Yigit, Pierrefonds (CA)

( * ) Notice: Subject to any disclaimer, the term of this patent is extended or adjusted under 35 U.S.C. 154(b) by 94 days.

(21) Appl. No.: 16/926,446

(22) Filed: Jul. 10, 2020

(51) Int. Cl.
| | |
|---|---|
| *G06V 20/58* | (2022.01) |
| *H04W 4/029* | (2018.01) |
| *H04N 5/225* | (2006.01) |
| *H04N 5/247* | (2006.01) |
| *G06T 7/70* | (2017.01) |
| *G01S 19/51* | (2010.01) |
| *G06V 10/40* | (2022.01) |
| *G06V 20/62* | (2022.01) |
| *G06V 30/10* | (2022.01) |

(52) U.S. Cl.
CPC ............ *G06V 20/584* (2022.01); *G01S 19/51* (2013.01); *G06T 7/70* (2017.01); *G06V 10/40* (2022.01); *G06V 20/62* (2022.01); *H04N 5/2253* (2013.01); *H04N 5/247* (2013.01); *H04W 4/029* (2018.02); *G06T 2207/10024* (2013.01); *G06T 2207/30252* (2013.01); *G06V 30/10* (2022.01)

(58) Field of Classification Search
CPC ...... G06K 9/00825; G06K 9/325; G06K 9/46; G06K 2209/01; G01S 19/51; G06T 7/70; G06T 2207/10024; G06T 2207/30252; H04N 5/2253; H04N 5/247; H04W 4/029; G06V 20/584; G06V 10/40; G06V 20/62; G06V 30/10
See application file for complete search history.

(56) References Cited

U.S. PATENT DOCUMENTS

| | | | | |
|---|---|---|---|---|
| 6,081,206 | A * | 6/2000 | Kielland ............ | G06Q 30/0284 |
| | | | | 194/902 |
| 6,459,386 | B1* | 10/2002 | Jones .................. | G08G 1/0175 |
| | | | | 340/932.2 |
| 2007/0029825 | A1* | 2/2007 | Franklin ............ | G06Q 30/0284 |
| | | | | 340/932.2 |

(Continued)

FOREIGN PATENT DOCUMENTS

| | | | | |
|---|---|---|---|---|
| CN | 111310698 | A * | 6/2020 | |
| KR | 101276545 | B1 * | 6/2013 | |
| WO | WO-2020046218 | A1 * | 3/2020 | ........... G08G 1/0175 |

OTHER PUBLICATIONS

"ScanGenius Step into the future of mobile ANPR", printed on Jan. 21, 2021, https://scangenius.arvoo.com/.

*Primary Examiner* — Ping Y Hsieh
*Assistant Examiner* — Daniella M. DiGuglielmo (57) ABSTRACT

A method of generating a context-rich parking event of a target vehicle taken by a patrol vehicle including obtaining a plate read event identifying an identifier of the target vehicle; initiating a collection of a first context image of a first view of the target vehicle; obtaining of geolocation information; obtaining temporal information; verifying if at least one condition is met by calculating if at least one of: a temporal constraint threshold is reached by using the temporal information; and a position constraint threshold is reached by using the geolocation information; initiating a collection by the patrol vehicle of a second context image of a second view of the target vehicle; and causing an association between the second context image and the plate read event to generate the context-rich parking event.

16 Claims, 5 Drawing Sheets

(56) References Cited

U.S. PATENT DOCUMENTS

2011/0234749 A1* 9/2011 Alon ................ G08G 1/054
                                                    348/36
2018/0350229 A1* 12/2018 Yigit ............... G08G 1/0175

* cited by examiner

SYSTEM AND METHOD FOR GENERATING CONTEXT-RICH PARKING EVENTS

TECHNICAL FIELD

The present disclosure relates to the field of parking enforcement systems. More particularly, the present disclosure relates to mobile, e.g. vehicle-bound, systems for parking enforcement which rely on data acquired in situ to ascertain the existence of parking violations such as the violation of parking rules forbidding a particular length of stay.

BACKGROUND

Current technologies used by patrol vehicles to identify parking violations usually possess an infrared camera for capturing the license plate information of the vehicle, and a colour camera (that can be part of the same housing as the infrared camera) for taking a context image that provides information on the appearance of the vehicle that is associated with the license plate reading (LPR) event. However, as the colour camera is usually positioned at a fixed position, the colour camera only provides limited contextual information on the vehicle, i.e. only one view (e.g. if the license plate is positioned on the rear of the vehicle, the context image usually only also captures the rear of the vehicle). Exemplary LPR systems are described in U.S. Pat. No. 6,081,206, incorporated by reference herein, and U.S. 2018/0350229, incorporated by reference.

As such, it would be advantageous to devise a system capable of providing more contextual information on the vehicle that is the subject of the plate read event.

SUMMARY

The present disclosure relates to a parking enforcement system deployed on a patrol vehicle configured to generate a context-rich parking event, i.e. a parking event with multiple context images provides more than one view of a target vehicle. As such, the parking event of the target vehicle provides additional information on the properties of the target vehicle by including more views of different sides of the target vehicle than current systems.

The parking enforcement system includes a camera system (multiple cameras or a camera with a 360-degree or close to 360-degree field of view) that can capture multiple views (capturing information on different sides) of a target vehicle. For instance, the camera system may include a first context camera at a first orientation, with a first line of sight, and a second context camera at a second orientation, with a second line of sight.

The parking enforcement system employs geolocation data and temporal data to verify if one or more conditions is met, the one or more conditions based on if a geolocation constraint threshold (e.g. change in position of the patrol vehicle) is reached and/or if a temporal constraint threshold (e.g. a period of time has lapsed) to initiate the collection of the second context image. The condition is verified as an indicator of if the patrol vehicle has changed its position with respect to the target vehicle. A change in the relative position of the patrol vehicle with respect to the target vehicle is important as it provides a different line of sight to the camera(s) of the patrol vehicle, allowing the patrol vehicle to capture more than one view of the target vehicle.

A broad aspect of the present disclosure is a method of generating a context-rich parking event of a target vehicle taken by a patrol vehicle comprising obtaining a plate read event identifying an identifier of the target vehicle; initiating a collection of a first context image of a first view of the target vehicle; obtaining of geolocation information of at least one of the patrol vehicle; and the target vehicle; obtaining temporal information associated with the generating of the plate read event or the collection of the first context image; verifying if at least one condition is met by calculating if at least one of a temporal constraint threshold is reached by using the temporal information; and a position constraint threshold is reached by using the geolocation information; after verifying that the at least one condition is met, initiating a collection by the patrol vehicle of a second context image of a second view of the target vehicle; and causing an association between the second context image and the parking event to generate the context-rich parking event.

In some embodiments, the first context image may be generated by a first colour camera of the patrol vehicle, and the second context image that is collected may be generated by a second colour camera of the patrol vehicle, wherein the first colour camera may have a different orientation from the second colour camera.

In some embodiments, the identifier may be a license plate number.

In some embodiments, the first context image may be generated by a first colour camera of the patrol vehicle, and the second context image that is collected may be generated by a second colour image of the patrol vehicle, wherein the first colour camera may have a different orientation from the second colour camera.

In some embodiments, the first view may include the back of the target vehicle, and the second view may include the front of the target vehicle.

In some embodiments, the geolocation information may be associated to a position of the patrol vehicle, wherein the verifying if at least one condition is met by calculating if the position constraint threshold is reached may be by calculating a change in position of the patrol vehicle from the position of the target vehicle when the parking event was generated.

In some embodiments, the verifying if at least one condition is met by calculating if the temporal constraint threshold may be reached by using the temporal information and by calculating the amount of time that has lapsed from the generating the plate read event.

In some embodiments, the first context image and the second context image may be generated from a same 360-degree colour camera.

In some embodiments, the second context image may be generated before the plate read event, the second context image stored in memory and retrieved when the condition is met.

In some embodiments, the method may include deriving geolocation information of the target vehicle from the geolocation information of the patrol vehicle, wherein the generated context-rich parking event comprises the geolocation information of the target vehicle.

In some embodiments, the second context image may be captured after the generating of the plate read event.

Another broad aspect is a parking enforcement system comprising a data interface for communicating with parking data acquisition hardware for receiving therefrom parking data pertaining to a target vehicle; a processing device in communication with the data interface, the processing device being configurable under computer readable storage instructions; computer-readable memory in communication with and accessible by the processing device storing computer-readable program code, the computer-readable program code causing the processing device to obtain a plate read event identifying an identifier of the target vehicle; initiate a collection of a first context image of a first view of the target vehicle; obtain geolocation information of at least one of the patrol vehicle; and the target vehicle; obtain temporal information associated with the generating of the plate read event or the collection of the first context image; verify if at least one condition is met by calculating if at least one of a temporal constraint threshold is reached by using the temporal information; and a position constraint threshold is reached by using the geolocation information; after verifying that the at least one condition is met, initiate a collection by the patrol vehicle of a second context image of a second view of the target vehicle; and cause an association between the second context image and the parking event to generate the context-rich parking event.

In some embodiments, the computer-readable program code may include instructions for causing the processing device to derive geolocation information of the target vehicle from the geolocation information of the patrol vehicle, wherein the generated context-rich parking event comprises the geolocation information of the target vehicle.

In some embodiments, the computer-readable program code may include instructions for causing the processing device to use the temporal information and to calculate the amount of time that has lapsed from the generating the plate read event to verify if the at least one condition is met is by calculating if the temporal constraint threshold is reached.

Another broad aspect is non-transitory storage media comprising program code that, when executed by a processing device, cause the processing device to obtain a plate read event identifying an identifier of the target vehicle; initiate a collection of a first context image of a first view of the target vehicle; obtain geolocation information of at least one of the patrol vehicle; and the target vehicle; obtain temporal information associated with the generating of the plate read event or the collection of the first context image; verify if at least one condition is met by calculating if at least one of a temporal constraint threshold is reached by using the temporal information; and a position constraint threshold is reached by using the geolocation information; after verifying that the at least one condition is met, initiate a collection by the patrol vehicle of a second context image of a second view of the target vehicle; and cause an association between the second context image and the parking event to generate the context-rich parking event.

BRIEF DESCRIPTION OF THE DRAWINGS

The invention will be better understood by way of the following detailed description of embodiments of the invention with reference to the appended drawings, in which.

DETAILED DESCRIPTION

The present disclosure relates to methods and systems for generating a parking event with additional information on the target vehicle of the parking event, namely by providing images of additional views (e.g. front and rear of the target vehicle) of the target vehicle that is subject of the parking event.

After a plate read event is generated and a first context image of the target vehicle is taken by the parking enforcement system of a patrol vehicle, the parking enforcement system verifies if a temporal constraint threshold or geolocation constraint threshold is reached. For instance, the system may verify, as a condition, if the patrol vehicle has travelled a certain distance from its position at which the patrol vehicle generated the plate read event, or may verify if a certain period of time has lapsed since the patrol vehicle generated the license plate read event.

Figure 3A:
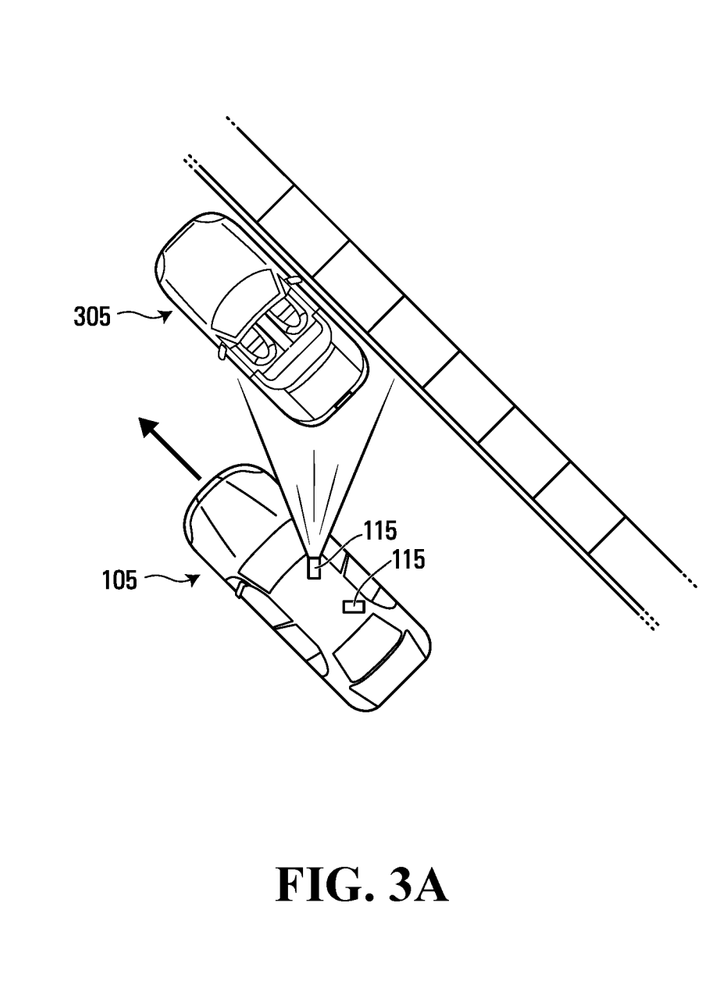
FIG. 3A is a perspective view of a patrol vehicle in a first position with a first camera having a view of a license plate of a target vehicle.
Figure 3B:
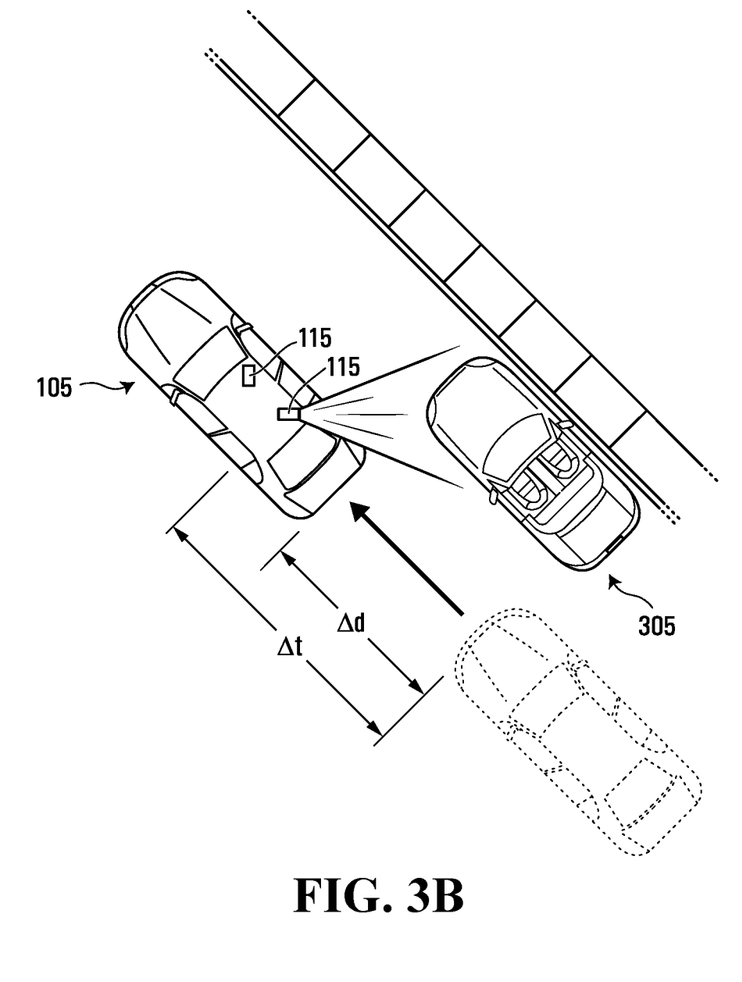
FIG. 3B is a perspective view of the patrol vehicle of FIG. 3A in a second position having a second camera having a view of the front of the target vehicle of FIG. 3B.

As shown in the example of FIGS. 3A and 3B, meeting this condition would indicate that the patrol vehicle is in a sufficiently different position with respect to the target vehicle than when the license plate read event was generated, such that a context camera of the patrol vehicle, offering a different ray of sight from that of the first context camera, is now, as a result of the displacement of the vehicle, positioned to capture an image of a second view of the target vehicle (FIG. 3A: a perspective view of the rear of the target vehicle; FIG. 3B: a perspective view of the front of the target vehicle). In the example of FIGS. 3A and 3B, the context-rich parking event is then generated with the one or more context images of the rear of the target vehicle, and the one or more context images of the rear of the target vehicle, providing additional contextual images of the target vehicle than if only one view of the target vehicle was taken as in U.S. Pat. No. 6,081,206.

Even though FIGS. 3A and 3B illustrate the patrol vehicle 105 as moving forward, it will be understood that the patrol vehicle 105 may also be backing up. In the example of a backing-up petrol vehicle 105, the patrol vehicle 105 may take one or more context images of the target vehicle 305 prior to the plate read event, the captured one or more context images stored in memory 114. Once the plate read event taken (the patrol vehicle 105 having backed-up sufficiently to have a context camera 115b with a line of sight of the license plate of the target vehicle 305—the license plate being in the field of view of the context camera 115b), and the condition met, the parking enforcement device 101 may cause the processing device 112 to retrieve from memory 114 the stored one or context images (e.g. providing a view of the front of the target vehicle 305), as further explained herein. The retrieved context image us then transmitted to the parking enforcement device 101 with the context image taken with the infrared image leading to the plate read event. The processing device 160 then, by executing the program code stored in memory 165, generates the context-rich parking event from the context images and the license plate event.

Definitions

In the present disclosure, by "patrol vehicle", it is meant a vehicle that is collecting the identifying data of a target vehicle. Exemplary patrol vehicles include, but are not limited to, police vehicles, security or surveillance vehicles, etc.

In the present disclosure, by "target vehicle", it is meant a vehicle of which identifying data (e.g. a license plate number, an image of a vehicle) is being collected, and that is the subject of a parking event or context-rich parking event.

Figure 2:
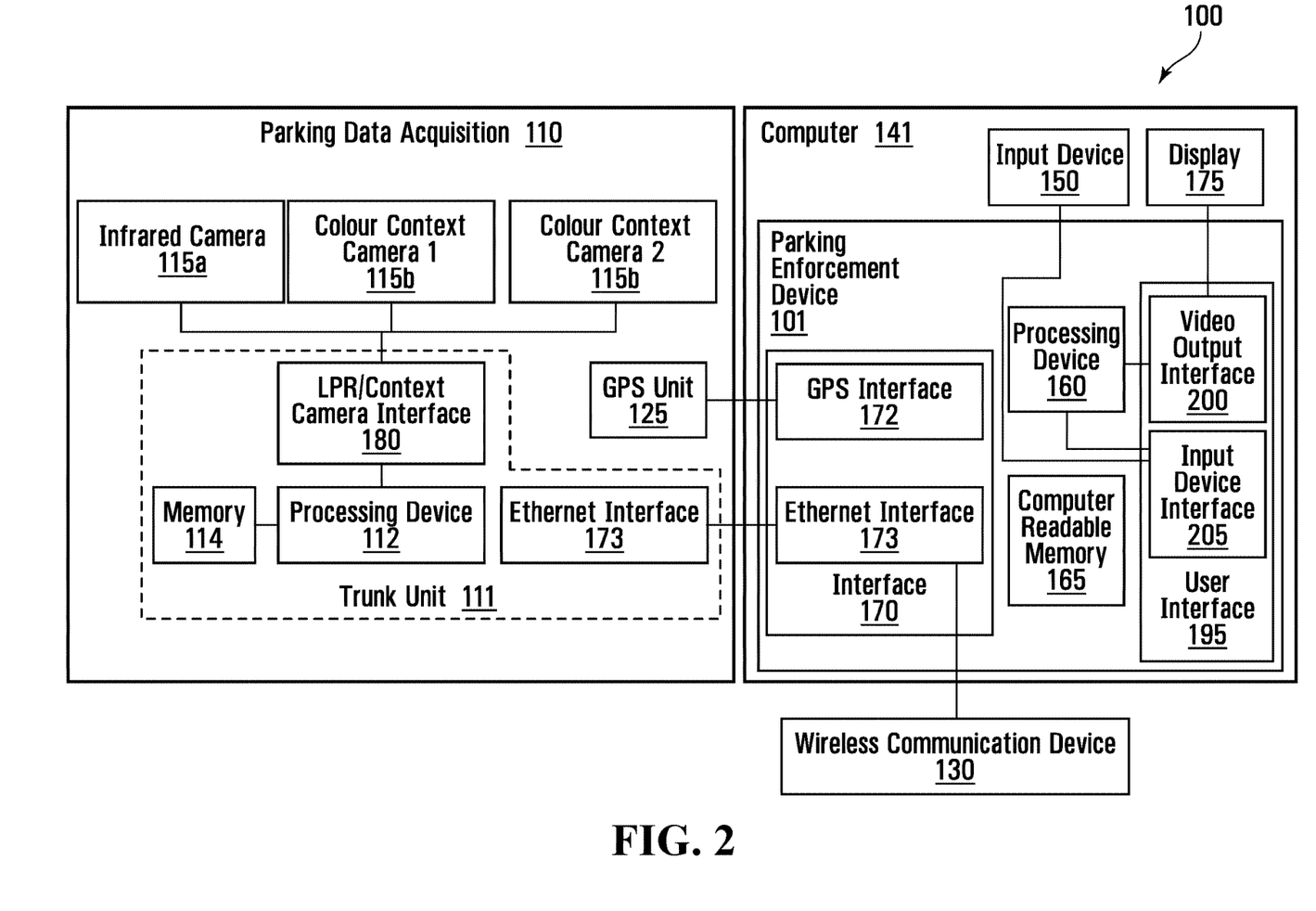
FIG. 2 is a block diagram of an exemplary parking enforcement system.

Exemplary Parking Enforcement System:

FIG. 2 illustrates a block diagram of the parking enforcement system 100 according to a first embodiment. As shown, the parking enforcement system 100 may comprise a parking enforcement device 101 which comprises the processing logic, memory and interfaces for performing parking enforcement with the parking enforcement system. The parking enforcement device 101 may be embodied within the computer 141.

The parking enforcement device 101 of this example comprises a processing device 160, which is a general-purpose programmable processor, namely in this example an Intel® Core™ i5-4300U vPro™ Processor running the Windows® 10 operating system. The parking enforcement device 101 also comprises computer readable memory 165 in communication with the processing device 160, which stores program instructions and data used by the processing device 160.

The computer readable memory 165, though shown as a unitary module for simplicity may comprise several memory modules. In particular, it may comprise several layers of memory such as a hard-drive, external drive (e.g. SD card storage) or the like and a faster and smaller RAM module. The RAM module may store data and/or program code currently being, recently being or soon to be processed by the processing device as well as cache data and/or program code from a hard drive. A hard drive may store program code and be accessed to retrieve such code for execution by the processing device, and may be accessed by the processing device 160 to store parking data. The computer readable memory 165 may be non-transitory.

The parking enforcement device 101 comprises logic configured to perform the steps and interactions described herein. In this particular example, logic is provided by way of configuration of the processing device 160 by computer-readable program code stored in the computer-readable memory 165. The computer-readable program code implements a patroller service in software as described herein. It is to be understood that in this embodiment, the program code storing the instructions for the processing device 160 to implement the software are stored in the computer-readable memory 165.

The parking enforcement device 101 also comprises a user interface 195 which may communicate with the input device 150 and the display 175. The user interface 195 in this example comprises a video output interface 200 and an input device interface 205 for communicating with the display 175 and input device 150 respectively. In the present example, since the parking enforcement device 101 is implemented in the computer 141, the user interface 195 comprises elements of the computer 141 such as the graphic interface of the computer and the bus interface used by the keyboard. The video output interface 200 of this example comprises a video processing unit. In alternate examples, the display device may comprise a display that is driven by an HDMI input and is separately powered from the patrol vehicle 105's battery with the video output interface 200 comprising an HDMI interface and port. The video output interface is in communication with the processing device 160 for receiving therefrom content to be displayed on the display 175. The video processing unit of the video output interface 200 may in certain embodiments share the use of some of the computer-readable memory 165 but in this example it has its own dedicated high-speed memory (not shown).

The input device interface 205 interfaces with the input device 150, in this example a keyboard. In embodiments where the input device 150 is an external device, such as an external keyboard, the input device interface 205 may comprise a USB connection for connecting with a USB keyboard. The input device interface 205 is in communication with the processing device 160 via a data bus to provide thereto input received from the input device 150.

The parking enforcement device 101 also comprises a parking data acquisition hardware interface 170 for communicating with the parking data acquisition hardware 110 and particularly for receiving parking data therefrom. In this example, the parking data acquisition hardware interface 170 may refer to the various data interface(s) used to receive parking-related data. In the example, parking data is received at the computer 141 over an Ethernet connection and the acquisition hardware interface 170 comprises the Ethernet interface 173 and the GPS interface 172 when the GPS unit 125 is connected via USB, as is the case here.

The camera interface 180 (in some examples, each camera 115a and 115b may have its own camera interface) is in communication with a processing device 112, which in this example comprises a general-purpose programmable processor running an operating system, in this example Windows® 10 embedded. The trunk unit 111 also comprises computer readable memory 114 in communication with the processing device 112, which stores program instructions and data used by the processing device 112.

The license plate and context camera interface 180 is configured to communicate with the license plate and context camera 115, specifically in this example to receive image data therefrom, but which may in alternate examples also provide communications thereto such as commands to scan or recognize a license plate. In this example, license plate recognition is performed by the processing device 112 based on images received at the license plate and context camera interface 180 and transmitted to the processing device 112 via a data bus. In other embodiments, the parking data acquisition hardware may comprise a standalone license plate reader (or other vehicle identifier detector) which identifies license plate numbers (or other vehicle identifiers, such as permits, RFID tags, etc. . . . ) and provides them via a suitable communication medium, e.g. a USB interface, to the parking data acquisition hardware interface 170. Returning to the present example, as mentioned the license plate and context camera 115 captures two types of images, monochrome and color images, by two separate capture devices, an infrared camera and a color camera. These may in some embodiments be provided together, e.g. in synched superframes containing both infrared and color images, however in this example the license plate and context camera 115 provides monochrome and color images as separate streams. These may be any suitable connections; in this example they are custom made cable connections that transport power to the camera and data therefrom. The license plate and context camera interface 180 comprises a bus interface which receive image data from the infrared and color cameras and transmits them via one or more data buses to the processing device 112.

The computer readable memory 114, though shown as a unitary module for simplicity may comprise several memory modules. In particular, it may comprise several layers of memory such as long term persistent storage (e.g. a hard-drive or external drive) or the like and a faster and smaller RAM module. The RAM module may store data and/or program code currently being, recently being or soon to be processed by the processing device as well as cache data and/or program code from a hard drive. The long term storage may store program code and be accessed to retrieve such code for execution by the processing device 112, and may be accessed by the processing device 112 to store data. The memory 114 may be non-transitory.

The parking data acquisition device 110 also includes logic configured to receive camera data from the various cameras, perform image capturing, OCR, analytics and event generation (e.g. plate read) and to transmit a parking event comprising or along with other parking or related data to the parking enforcement device 101 and more particularly to the patroller service software running thereon. In this particular example, logic is provided by way of configuration of the processing device 112 by computer-readable program code stored in the computer-readable memory 114. The computer-readable program code implements a trunk unit software. The program code storing the instructions for the processing device 112 to implement the software are stored in the computer-readable memory 114.

The parking data acquisition device 110 may also include a second context camera 115b for taking at least one additional context image of a target vehicle. In the examples where the parking data acquisition device 110 has two context cameras 115b (where one of the context cameras 115b may be in the same housing as the infrared camera 115a), the first and the second context camera 115b may be positioned on the patrol vehicle with different orientations one from the other.

In order to communicate with the parking enforcement device 101, the parking data acquisition hardware 110 comprises an Ethernet interface 173, which allows network communication with the computer 141.

The GPS interface 172 is configured to communicate with the GPS unit 125. In this particular example, the GPS unit 125 comprises a GPS antenna and a receiver which comprises GPS logic for receiving GPS signals, temporal information (e.g. time) and compute a location based thereon. The GPS unit 125 communicates with the GPS interface 172 via a suitable medium, here a USB connection, and transmits location information, here in the form of NMEA formatted positioning data, to the GPS interface 172. The GPS interface 172 comprises a USB port and interface and communicates the received GPS to patroller service software running on the processing device 160. In alternate embodiments, the GPS logic for determining a location based on GPS signals may be provided within the parking enforcement device 101, for example within the GPS interface 172. In such a case, the GPS unit 125 may comprise the GPS antenna and the communication with the GPS interface 172 may be over a shielded connection that transmits directly the GPS signals as received. The GPS interface 172 would then comprise demodulation logic to interpret the received signals. While GPS is used in this example, it has already been mentioned that other types of location hardware may be used, such as dead reckoning systems. Other satellite-based or terrestrial antenna-based location systems may also be used.

The parking data acquisition device 110, or the parking enforcement device 101, may also have another device, such as a clock, for generating the temporal data (e.g. time of day or a chronometer for calculating the time lapsed from a particular event).

The parking enforcement device 101 also comprises a wireless interface which communicates with the wireless communication device 130. Although shown as separate from the parking enforcement device 101, this and other units may be provided on-board or within the housing of the parking enforcement device 101. The wireless communication device of this example comprises a cellular network modem for communicating data wirelessly with a cellular network, particularly here using the LTE and/or 3G standard. The Ethernet interface 173 is in communication with the wireless communication device 130 and provides data to the wireless modem to transmit to a remote address, in this case over the internet, and receives data from the wireless modem. Thus, in this example the Ethernet interface 173 serves as the wireless interface although in other examples a separate interface may be provided to communicate with the wireless communication device. The wireless communication device 130 provides internet connectivity to the connected components. Although in this example the wireless communication device 130 uses certain cellular data standards, other wireless communication standards, and other media such as satellite communication may be used in its stead or to complement it.

The wireless interface in this example takes the form of the Ethernet interface 173 which provides routing to and from the wireless communication device 130.

The illustrated example is exemplary only. It is conceivable, for example that using a particular system-on-a-chip, certain components shown separately be integrated with the processing device 160. For example, the processing device 160 may comprise software code modules for receiving, formatting, interpreting and/or storing data received from parking data acquisition hardware 110 or the user interface system 195 and may include an on-chip video processing unit.

Figure 4:
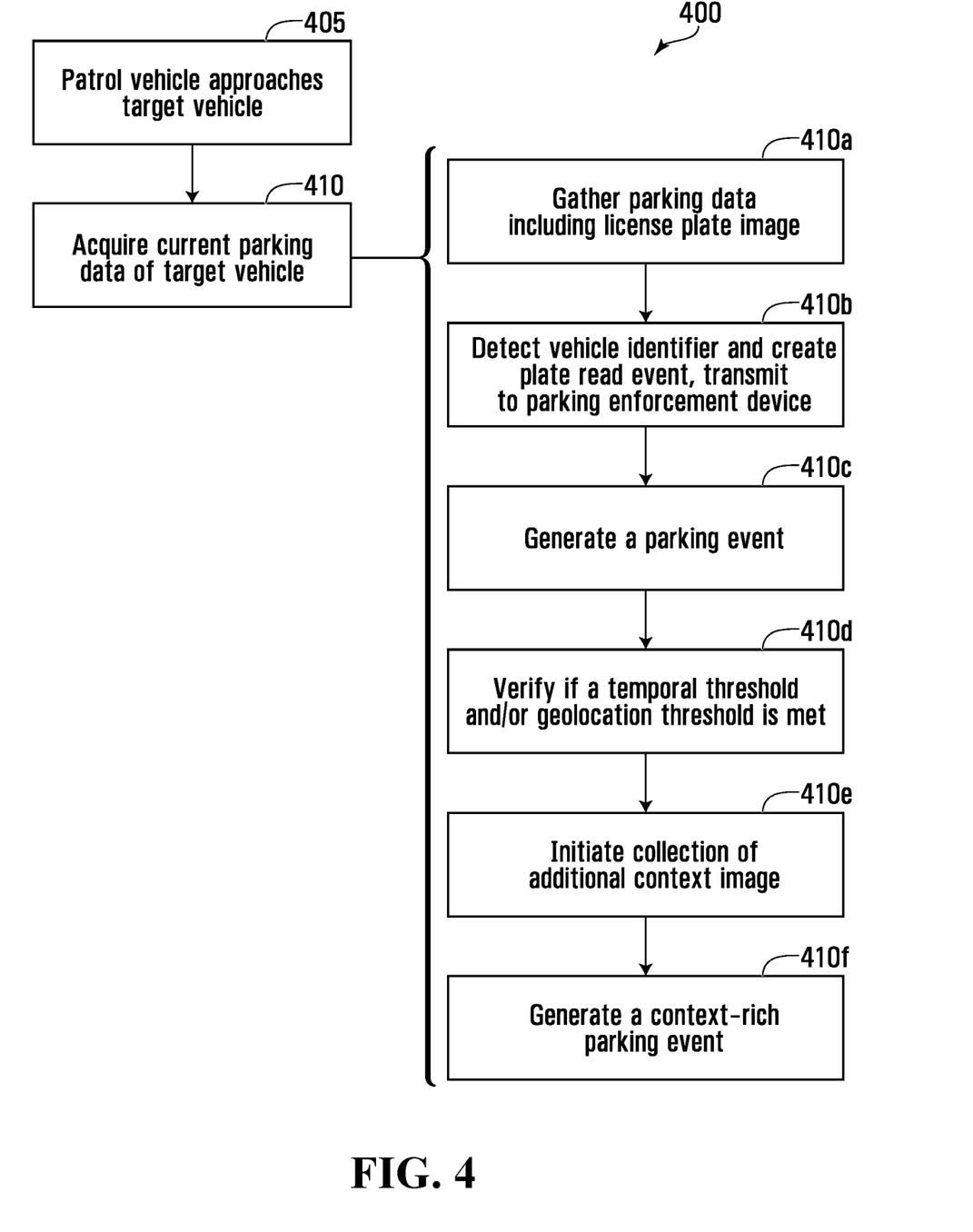
FIG. 4 is a flowchart diagram of an exemplary method of generating a context-rich parking event.

Exemplary Method of Generating a Context-Rich Parking Event:

Reference will now be made to FIG. 4, illustrating an exemplary method 400 of generating a context-rich parking event in accordance with the present teachings. For illustrative purposes, reference will be made to system 100. However, it will be understood that any system, in accordance with the present teachings, may be used to performed the present method.

At step 405, the patrol vehicle 105 approaches a parked target vehicle, here a first parked car 305, and the patrol vehicle 105 brings the parking enforcement system 100 nearby the first parked car 305.

With the parked car 305 nearby, the parking data acquisition hardware 110 acquires parking data pertaining to the first parked car 305 at step 410. In this example, the parking acquisition hardware 110, including the GPS unit 125, license plate and context camera 115 can operate rapidly in real time and this operation can take place even as the patrol vehicle 105 is still moving.

During data acquisition, an infrared camera in the license plate and context camera 115 captures images of the parked car 305's license plate. This may be prompted from user input. In one example, the parking enforcement device is constantly receiving the output of the data acquisition hardware 110 or part thereof and provides a user with output based on the received input. For example, the color camera of the license plate and context camera 115 may be continuously capturing images. A user using the computer 141 may view the feed from the license plate and context camera 115, either by accessing a web portal, if one is provided, over the Ethernet connection, or the patroller service software may connect to the trunk unit 111 and retransmit the monochrome or color camera feed. The first context camera 115 has a first line of sight of the target vehicle.

In the embodiments where a second context camera 115*b* is present as part of system 100, the second context camera 115*b* may also be continuously capturing images.

In the present example, the parking data acquisition hardware 101 is constantly working while enabled, with the license plate and context camera 115 providing the trunk unit 111 images, some of which will eventually comprise a license plate image. This occurs at step 410 *a*. The trunk unit 111 performs license plate detection on the monochrome video data and when a license plate is read, at step 410 *b*, it triggers a plate read event, and transmits the license plate data, along with other parking data as described, to the parking enforcement device 101. This particular architecture, with the trunk unit 111 performing plate reads and creating plate read events and transmitting them to the parking enforcement device 101 is exemplary and the reader should appreciate that the trunk unit 111 and parking enforcement device 101 may be merged in alternate embodiments. Optionally other/different data may be provided with the plate read event. Optionally this process may also be manual; when the user sees that the first parked car 305 is nearby, in range of the parking data acquisition hardware 110, and/or that the parked car 305's license plate is in view, the user may provide an input on the input device 150 requesting a license plate read or other parking data acquisition. The input device interface 205 receives, this input and transmits it to the processing device 160, where program code interprets the input as the instruction and in response engages parking data acquisition by running corresponding program code modules. In some embodiments, manual triggering of plate acquisition may be used, for example, when the system fails to automatically read a license plate.

Thus, the processing device 112 engages license plate recognition at step 410 *b*. In this example, the infrared camera is constantly transmitting monochrome images to the trunk unit 111. This signal is processed by embedded trunk unit software and only valid license plate read events are sent to the parking enforcement device 101. License plate recognition is engaged by executing at the processing device 112 program code instructing the processing device 112 to process the current infrared image or images to detect a license plate number. Any suitable license plate reading algorithm may be used, which may be performed using one or more license plate image. In this particular example, the processing device 112 executes a license plate recognition module, which in this example is a program code module, that performs a license plate recognition algorithm to extract the image-space location (specifically here, pixel coordinates) of the license plate. The image feature identification module performs an extraction of a license plate region, a segmentation and recognition of the license plate features, in this case license plate characters. The processing device 112 accesses the image space location of the license plate in the images to obtain the portion of the images featuring the license plate. The processing device 112 may then execute under instructions by the license plate recognition module a de-rotation and de-skewing algorithmic logic which it applies to the license plate image in order to generate a plate image that is a flat (horizontal) rectangle. The license plate recognition module may comprise algorithmic logic (in this case program code instructions) to calculate the sum of the image intensity (Y value) columns of the image and applies it to generate an image intensity profile. The license plate reading recognition module outputs a value for the license plate.

The system is able to deal with errors in plate reads, errors/inaccuracies in GPS positioning as well as minor relocations of the parked-vehicles. Plate read errors include character additions, deletions and substitutions. This allows compensation for imperfect license plate reads. In order to match two plate reads at times T1 and T2, several factors are accounted for including:

a. the number of optically equivalent characters in the sets of characters of each read. For example, ABC123 resembles A8C123 since B and 8 are optically similar; and
   b. the Levenshtein distance between the two sets of characters. For example, the Levenshtein distance between ABC123 and ABC124 is 1.

The number of optically equivalent characters and the Levenshtein distance permitted vary as a function of the length of the character set. In one example AB122 is a five-character set and a match may only have 1 optical equivalent and a Levenshtein distance of 1. A 4 character set match may only have a maximum of 0 optical equivalents and a Levenshtein distance of 0. The objective may be to find the most likely match(es) with few or no false positive.

Thus, the license plate recognition module is a vehicle identifier detection module as it determines a license plate number as a vehicle identifier for the parked car 305. In alternate embodiments, the vehicle identifier detection module may perform a different vehicle identifier detection algorithm. For example, it may command external hardware, e.g. an RFID reader, to scan for and/or provide an RFID code. Alternatively, where the vehicle identifier is a permit number, the module may perform an optical recognition algorithm on the color (or infrared) image of a parking permit. The license plate recognition module may also be applied to color images although infrared images are preferred as they have been found to present a clearer image of license plates in more conditions, and in this example have higher resolution. The license plate and context camera 115 comprises infrared light sources to provide even better conditions for license plate recognition.

In addition to recognizing a vehicle identifier, the license plate recognition module may cause the storing in computer-readable memory of license plate image(s) used in the license plate identification as context data.

At the parking enforcement device 101, upon receiving a plate read event, a parking event is created storing therein parking data provided with the plate read event, at step 410 *c*. In response to the parking data acquisition, the processing device 160 stores context data pertaining to the parked vehicle 305, in this example, one or more color images of the parked vehicle 305. This may be performed simultaneously or in any order relative to the license plate recognition. This context data may be useful in proving guilt when a parking violation is contested.

In the above example, parking data acquisition was automatic. Particularly, the license plate and context camera 115 is continuously capturing images for the detection of license plates, e.g. monochrome images from the infrared camera, which are received at the parking data acquisition hardware 110 and analyzed for license plate detection as described. To this end, the trunk unit 111 or parking data acquisition hardware 110 repeatedly runs the license plate recognition module (or more broadly, vehicle identifier detection module) to detect a license plate. Every time a new license plate is detected, the remainder of the process is engaged, including storage of context data. Alternatively, plate reading may comprise a user prompt for a plate read. However, the user may optionally have the option to enable or disable the license plate reading by providing input at the input device which is received and interpreted at the processing device 160 which in response enables or disables license plate reading. In this embodiment where license plate detection is performed outside of the computer 141, this may involve sending an instruction from the computer 141 to disable plate reading to the trunk unit 111, but more simply may just involve setting the parking enforcement device 101 to ignore plate read events. Thus, a parking enforcement agent driving the patrol vehicle 105 may engage the system only when driving by parked vehicles.

The parking data acquisition hardware 110 (in this example the trunk unit 111) gathers parking data and generates a plate read event containing information related to the plate read. In this context, this data comprises a time-stamp, the license plate number and additional analytics such as the plate state/jurisdiction, a read confidence score, a vehicle make and mode, a relative speed, etc. The parking data acquisition hardware 110 may also include in or with the plate read event image data, such as a context image and a plate image. To this end, the trunk unit software comprises a parking event creation module, here in the form of program code which may be stored in computer-readable memory 114, to create a plate read event. This may be prompted by user input, however in this example, the processing device 112 engages the read event creation module in response to detecting a vehicle identifier, specifically here a license plate.

The plate read event is then transferred to the parking enforcement device 101 still at step 410 *b*. In alternate embodiments, the trunk unit 111 and parking enforcement device 101 functionalities may be merged onto a single device, e.g. a computer running both the trunk unit software and the patroller service software, or the functionality of both could be combined into a single software. In such cases, the plate read event may be transferred via inter-process or inter-thread communication. At step 410 *c*, the parking enforcement device 101 stores data from the plate read event.

The parking enforcement device 101 may also receive one or more context images from the first context camera 115*b* that has the same orientation as the camera that obtained the image for generating the plate read event. The parking enforcement device 101 may also receive temporal information and geolocation information from, e.g., the GPS unit 125 via the GPS interface 172.

Optionally, the parking enforcement device 101 may create a first parking event from the plate read event and other data received with the plate read event. In other embodiments, the parking enforcement device 101 may wait until the parking enforcement device 101 receives one or more additional context images showing a different view of the target vehicle before generating a parking event, being a context-rich parking event as the parking event includes context images showing at least two different views of the target vehicle.

After the parking enforcement device 101 receives the plate read event, the program code stored in computer-readable memory 165 of the parking enforcement device 101, executed by processing device 160, verifies if a temporal constraint threshold and/or a geolocation constraint threshold is met at step 410*d* based on the geolocation data and the temporal data respectively received from the parking data acquisition hardware 110 associated with the plate read event. For instance, the parking enforcement device 101 may calculate if a certain time has lapsed since the generating of the plate read event (which may include the time of when the image was taken that lead to the plate read event), the time period being the temporal constraint threshold. For instance, the temporal constraint threshold may be if 5 seconds have lapsed since the plate read event. The temporal constraint threshold may also be calculated and vary as a function of the speed of the patrol vehicle.

The geolocation constraint threshold is a measure of a distance between the target vehicle and the patrol vehicle, a change in position of the patrol vehicle measured from when the plate read event was generated, or a change in position with respect to target vehicle and the patrol vehicle. For instance, parking enforcement device 101 may verify if the position of the patrol vehicle has changed by 10 meters (the geolocation constraint threshold). If so, then the geolocation constraint threshold has been met.

Figure 1:
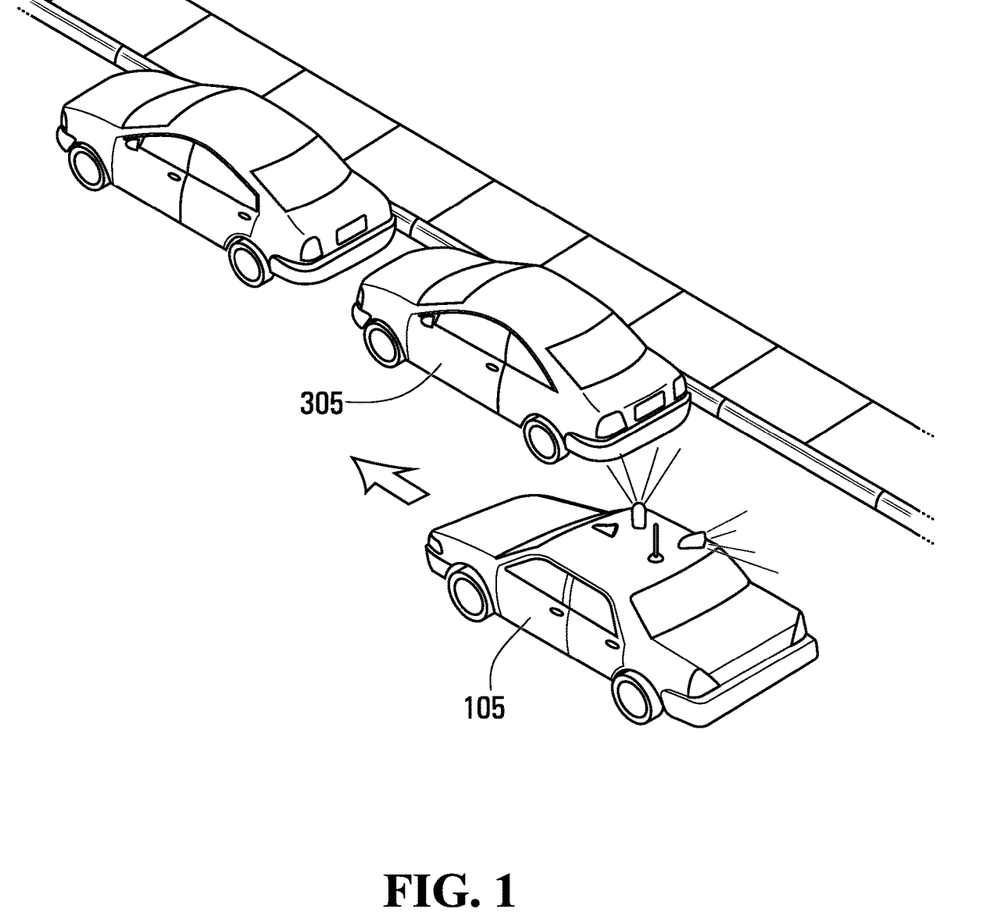
FIG. 1 is a perspective view of a patrol vehicle executing parking enforcement with the parking enforcement system.

The geolocation constraint threshold and/or the temporal constraint threshold are set to indicate if the patrol vehicle has changed its position with respect to the target vehicle. This change in position indicates that a second view of the target vehicle can now be captured. For instance, if the patrol vehicle is approaching the target vehicle, a first context camera 115*b* and an infrared camera 115*a* of the patrol vehicle having access to the rear of the vehicle and the license plate of the vehicle, the parking data acquisition hardware 110 can capture the rear of the vehicle (a first view of the vehicle). However, as the patrol vehicle continues to move at a given speed, passing the target vehicle, eventually the patrol vehicle will have surpassed the target vehicle. For instance, a context camera 115*b* aimed to capture images located behind the patrol vehicle, as shown in FIG. 1, can now capture the front of the target vehicle, where the position of the patrol vehicle with respect to the target vehicle provides a clear view of the front of the target vehicle for the additional context camera 115*b* of the patrol vehicle aimed to capture images of a rear view of the patrol vehicle. As such, in this example, the first view of the target vehicle is a perspective view of the rear of the target vehicle, where the second view of the target vehicle is a perspective view of the front of the target vehicle.

Once the temporal constraint threshold and/or the geolocation constraint threshold is met, the parking enforcement device 101 initiates the collection of one or more additional context images of the target vehicle at step 410*e*. The parking enforcement device 101 may transmit a command to processing device 112 that in turn causes the colour context camera 115*b*, e.g., positioned to capture images towards the rear of the vehicle, to take one or more context images. As such, the parking data acquisition hardware 110 has now taken one or more context images of a first view of the target vehicle, and one or more context images of a second view of the target vehicle.

It will be understood that even though some parking data acquisition hardware may have two or more context cameras fixed in different orientations with respect to one-another, both having different lines-of-sight, in order to enable the capturing of different views of a target vehicle (as shown in FIG. 1), in other embodiments, a single context camera may be (or camera system including an infrared camera), where the camera is configured to take a 360 degree (or almost 360 degree) image, where certain portions of the images can then be isolated in order to focus on portions of the image showing, e.g., the target vehicle.

In some examples, the second context image may be captured by the context camera before the plate read event is generated. For instance, the second context camera 115b may be capturing images that are stored in memory 114, the images stored for a given time (e.g. 30 seconds). Once the condition is met (time constraint threshold is reached; geolocation constraint threshold is reached), the parking enforcement device 101 may prompt the parking data acquisition hardware 110 to retrieve, or the parking data acquisition hardware 110 may retrieve the second context image taken previously from memory 114, the retrieved second context image then sent to the parking enforcement device 101 with the plate read event and the first context image to generate the context-rich parking event. This example may be used when, for instance, the patrol vehicle is backing up. As such, the context camera(s) of the patrol vehicle will first have a line-of-sight of the front of the target vehicle (capturing an image of same), then of the rear of the vehicle, including the license plate of the vehicle (obtaining an infrared image of the license plate, and a context image of the rear of the vehicle).

The additional one or more context images showing a second view of the target vehicle are then transmitted to the parking enforcement device 101 via the ethernet interface 173. The parking enforcement device 101 then generates the context-rich parking event at step 410f, including the one or more context images of a first view of the target vehicle and the one or more context images of a second view of the target vehicle.

The patroller service software comprises a parking event creation module, here in the form of program code which may be stored in computer-readable memory 165, to create a parking event or context-rich parking event. The parking event and context-rich parking event typically comprises the parking data from the plate read event, although some data may be omitted, if unnecessary.

Figure 5:
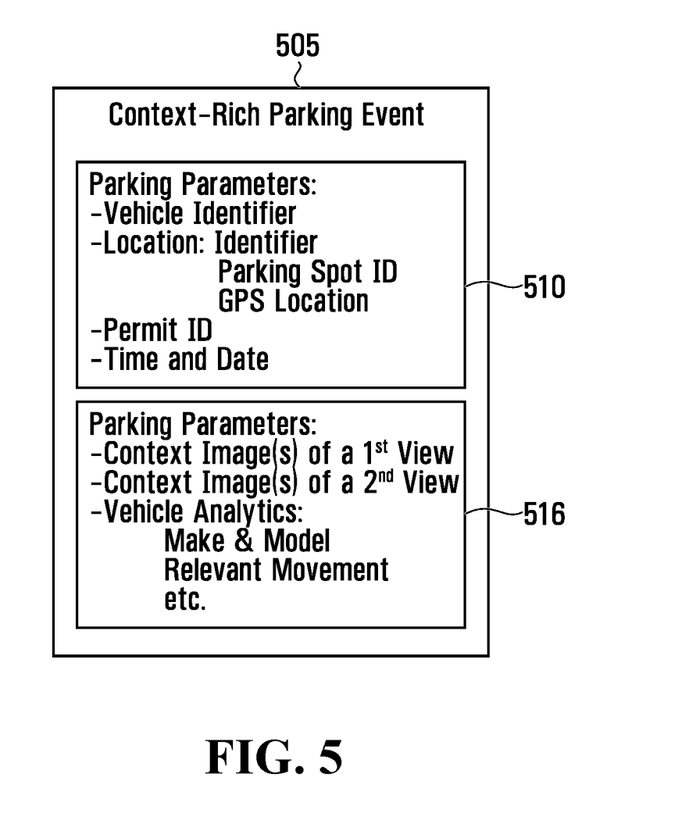
FIG. 5 is a block diagram of an exemplary parking event object created by the parking enforcement system.

A context-rich parking event in this example is a grouping of data, for example a data structure, comprising data pertaining to an observed parked vehicle at a particular time. The context-rich parking event includes one or more context images taken of a first view of a target vehicle, and one or more context images of a second view of the target vehicle. Its content may be adapted to the type of parking regulations being enforced. In this example, the parking enforcement system is used to enforce parking violations such as overtime violation, permit violation and permit sharing. FIG. 5 illustrates the content of an exemplary context-rich parking event 505.

As shown, the context-rich parking event comprises data categorized into two types: parking parameter 510 and context data 516. The parking parameters in this example include the vehicle identifier, here the license plate data, location identifier(s), and may also comprise one or more permit IDs associated with the parked car 305.

In this particular example, the location identifier is a GPS location as determined by the GPS unit 125. The processing device 160 of this example comprises a location calculation module that may compute the location of the parked vehicle 305 on the basis of the location found by the GPS unit 125, e.g. by applying an offset to account for the distance between the GPS unit 125 and the parked vehicle 305 on the basis of the side of the vehicle 105 on which it was detected. In this example, the GPS data is stored as a field in the parking parameters object, however in other examples it may be associated with another form of data, e.g. as metadata to an image file or vehicle identifier object.

The parking parameters also comprise time and date data, which in this example is received from the GPS unit 125 and stored as a field in the parking parameters object.

In other embodiments, there may be another time source. For example, the computer 141 may provide the time source and other devices such as the trunk unit 111 may synchronize with the computer 141's time.

The context-rich parking event may also comprise other data such as data identifying the patrol vehicle 105, a user or agent using the parking enforcement system 100, and other data.

A context-rich parking event includes additional content data, namely one or more context images showing at least one additional view of the vehicle.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. A method of generating a context-rich parking event of a target vehicle taken by a patrol vehicle comprising:
    obtaining a plate read event identifying an identifier of the target vehicle;
    initiating a collection of a first context image of a first view of the target vehicle;
    obtaining geolocation information of at least one of:
        the patrol vehicle; and
        the target vehicle;
    obtaining temporal information associated with the obtaining of the plate read event or the collection of the first context image;
    determining a change in a relative position of the patrol vehicle with respect to the target vehicle by verifying if at least one condition is met by calculating if at least one of:
        a temporal constraint threshold is reached by using the temporal information; and
        a position constraint threshold is reached by using the geolocation information;
    after verifying that the at least one condition is met, initiating a collection by the patrol vehicle of a second context image of a second view of the target vehicle different from the first view; and
    causing an association between the first context image, the second context image and the plate read event to generate the context-rich parking event with multiple views of the target vehicle taken at different relative positions of the patrol vehicle with respect to the target vehicle.

2. The method as defined in claim 1, wherein the first context image is generated by a first colour camera of the patrol vehicle, and the second context image that is collected is generated by a second colour camera of the patrol vehicle, wherein the first colour camera has a different orientation from the second colour camera.

3. The method as defined in claim 2, wherein the first colour camera is positioned at a front of a roof of a patrol vehicle, and the second colour camera is positioned at a rear of a roof of a patrol vehicle, wherein the first colour camera and the second colour camera are positioned on a same side of the patrol vehicle.

4. The method as defined in claim 1, wherein the identifier is a license plate number.

5. The method as defined in claim 1, wherein the first view comprises a back of the target vehicle, and the second view comprises a front of the target vehicle.

6. The method as defined in claim 1, wherein the geolocation information is associated to a position of the patrol vehicle, wherein the verifying if at least one condition is met by calculating if the position constraint threshold is reached is by calculating a change in position of the patrol vehicle with respect to a position of the target vehicle when the plate read event was generated.

7. The method as defined in claim 1, wherein the verifying if at least one condition is met by calculating if the temporal constraint threshold is reached by using the temporal information and by calculating an amount of time that has lapsed from the obtaining of the plate read event.

8. The method as defined in claim 1, wherein the first context image and the second context image are generated from a same 360-degree colour camera.

9. The method as defined in claim 1, wherein the second context image is generated before the plate read event, the second context image stored in memory and retrieved when the condition is met.

10. The method as defined in claim 1, further comprising deriving geolocation information of the target vehicle from the geolocation information of the patrol vehicle, wherein the generated context-rich parking event comprises the geolocation information of the target vehicle.

11. The method as defined in claim 1, wherein the second context image is captured after the obtaining of the plate read event.

12. A parking enforcement system comprising:
a data interface for communicating with parking data acquisition hardware for receiving therefrom parking data pertaining to a target vehicle;
a processing device in communication with the data interface, the processing device being configurable under computer readable storage instructions;
computer-readable memory in communication with and accessible by the processing device storing computer-readable program code, the computer-readable program code causing the processing device to:
obtain a plate read event identifying an identifier of the target vehicle;
initiate a collection of a first context image of a first view of the target vehicle;
obtain geolocation information of at least one of:
the patrol vehicle; and
the target vehicle;
obtain temporal information associated with the obtaining of the plate read event or the collection of the first context image;
determine a change in a relative position of the patrol vehicle with respect to the target vehicle by verifying if at least one condition is met by calculating if at least one of:
a temporal constraint threshold is reached by using the temporal information; and
a position constraint threshold is reached by using the geolocation information;
after verifying that the at least one condition is met, initiate a collection by the patrol vehicle of a second context image of a second view of the target vehicle different from the first view; and
cause an association between the first context image, second context image and the plate read event to generate a context-rich parking event with multiple views of the target vehicle taken at different relative positions of the patrol vehicle with respect to the target vehicle.

13. The system of claim 12, the computer-readable program code causing the processing device to derive geolocation information of the target vehicle from the geolocation information of the patrol vehicle and to include the geolocation information of the target vehicle in the context-rich parking event.

14. The system as defined in claim 12, the computer-readable program code further comprising instructions for causing the processing device to use the temporal information and to calculate an amount of time that has lapsed from the obtaining of the plate read event to verify if the at least one condition is met is by calculating if the temporal constraint threshold is reached.

15. Non-transitory storage media comprising program code that,
when executed by a processing device, cause the processing device to:
obtain a plate read event identifying an identifier of a target vehicle;
initiate a collection of a first context image of a first view of the target vehicle;
obtain geolocation information of at least one of:
a patrol vehicle; and
the target vehicle;
obtain temporal information associated with the obtaining of the plate read event or the collection of the first context image;
determine a change in a relative position of the patrol vehicle with respect to the target vehicle by verifying if at least one condition is met by calculating if at least one of:
a temporal constraint threshold is reached by using the temporal information; and
a position constraint threshold is reached by using the geolocation information;
after verifying that the at least one condition is met, initiate a collection by the patrol vehicle of a second context image of a second view of the target vehicle different from the first view; and
cause an association between the second context image and the plate read event to generate a context-rich parking event with multiple views of the target vehicle taken at different relative positions of the patrol vehicle with respect to the target vehicle.

16. A method of generating a context-rich parking event of a target vehicle taken by a patrol vehicle comprising:

generating a plate read event of a license plate of the target vehicle;

initiating a collection of a first context image of a first view of the target vehicle;

initiating a collection of a second context image of a second view of the target vehicle different from the first view after determining a change in a relative position of the patrol vehicle with respect to the target vehicle; and associating the second context image and the plate read event to generate the context-rich parking event with multiple views of the target vehicle taken at different relative positions of the patrol vehicle with respect to the target vehicle.

* * * * *